3,518,107
POLYSULFIDE SEALANT BONDED TO CEMENTITIOUS AND ASPHALTIC SUBSTRATES
Edward G. Millen, Princeton, N.J., assignor to Thiokol Chemical Corporation, Bristol, Pa., a corporation of Delaware
No Drawing. Original application May 2, 1966, Ser. No. 546,507. Divided and this application Jan. 16, 1969, Ser. No. 821,531
Int. Cl. B44d 1/14; B32b 13/12, 11/04
U.S. Cl. 117—72
3 Claims

ABSTRACT OF THE DISCLOSURE

A curable, liquid polysulfide polymer sealant composition is bonded to a cementious or asphaltic substrate by means of a primer comprising a halogenated rubber and a polyisocyanate compound.

---

This is a division of application Ser. No. 546,507, filed May 2, 1966, now abandoned.

The present invention relates to a primer composition to be used in conjunction with a liquid polysulfide polymer composition and to processes for bonding liquid polysulfide polymer compositions to mortar, gypsum plaster, Portland cement, magnesium aluminate cement, so-called magnesium oxychloride cement, concretes made from such cements, terrazzo, plaster of Paris and like hydraulic cement materials (hereinafter called hydraulic cementitious materials) and to asphaltic materials.

Curable, liquid polysulfide polymer compositions have long been known in the art. They are based on curable, liquid, polysulfide polymers such as disclosed in U.S. 2,466,963. The polymer compositions are used in sealing and/or caulking operations to bond together, and/or fill seams between various types of structural elements in various industries. The adhesive qualities of polysulfide polymers are such, however, as to require, in some cases, the use of an adhesive additive therewith, either in the polysulfide polymer based sealant composition itself or applied to the substrate to which the sealant is to be applied as a primer prior to the application of the sealant in order to insure a good bonding of the cured sealant to the substate.

Efforts have been made to find a good adhesive for hydraulic cementitious and asphaltic substrates. However, polysulfide polymer compositions have shown relatively poor adhesion to such substrates and especially when such substrates have been very moist when the polysulfide sealant was applied or when the polysulfide sealant after application to the substrate was exposed to moisture. Attempts to find a suitable primer for use with polysulfide polymer compositions to improve the adhesion thereof to such substrates have met with little or no success up to the time of the present invention.

It is therefore an object of the present invention to provide a novel primer composition which gives increased adhesion after application of a polysulfide polymer composition to a hydraulic cementitious or asphaltic substrate.

It is a further object of the present invention to provide a novel primer composition to improve the adhesion between a polysulfide polymer composition and a damp or wet hydraulic cementitious or asphaltic substrate and which bond has good resistance to water.

These and other objects are accomplished by first applying to a hydraulic cementitious or asphaltic substrate a primer composition comprising a halogenated rubber and a polyisocyanate compound and shortly thereafter applying to the primed substrate a polysulfide polymer based sealant composition and thereafter allowing the sealant to cure. The present invention includes the concept of "treating" one or more substrates by means of the novel processes and/or compositions disclosed herein and such "treating" includes providing such substrates with protective coatings of the cured compositions of the present invention and/or filling voids between and/or bonding together two or more substrates which may or may not be composed of the same material.

The novel primer compositions of the present invention comprise a mixture of a halogenated rubber and a polyisocyanate compound. The ratio of halogenated rubber to polyisocyanate in the primer composition in parts by weight may range from about 1:5 to about 5:1.

The halogenated rubber useful in the present invention includes for example, the chlorinated butyl rubbers of U.S. 3,059,682 and the chlorinated and/or brominated rubber produced from the reaction of chlorine and/or bromine with natural rubber. Also included is chlorinated polyethylene rubber such as disclosed in Chemical Week 98, 44–45 (Jan. 29, 1966), polychloroprene, and chlorosulfonated polyethylene. A primer composition comprising a chlorinated natural rubber is a preferred embodiment.

Polyisocyanate compounds suitable for use in the novel primer composition of the present invention may be aromatic or aliphatic in nature and include, for example, 2,4- and 2,6-toluene diisocyanates, diphenylmethane-4,4'-diisocyanate, para and meta phenylene diisocyanate, hexamethylene diisocyanate, 3,3 - bitolylene - 4,4' - diisocyanate, 1,5-naphthalene diisocyanate, and triphenyl methane 4,4',4''-triisocyanate.

The primer compositions of the present invention are preferably applied to the surface of the substrate(s) being treated in the form of a solution so as to provide thereon at least a monomolecular layer of the primer material and to aid in the ease and economy of application. Solvents and thinners employed should be volatile, waterfree and should not contain reactive hydrogen. Suitable examples include organic solvents, such as turpentine, benzene, toluene, acetone, methylene chloride and ethyl acetate. These primer compositions should generally have a solids content of from about 25 to 60 percent and preferably from about 40 to 50 percent.

The polysulfide polymers upon which the compositions of the present invention are based are organic polymeric materials which are liquid at room temperature and which contain recurring polysulfide linkages, i.e., $\pm S_n\pm$, in the polymeric backbone wherein $n$ is, on the average about 1.5 to 5. For chain extension and curing purposes these polymers should contain reactive groups such as —SH, —OH, —NH$_2$, —NCO. These polymers include for example, those liquid polythiopolymercaptan polymers as are disclosed, as noted above, in U.S. 2,466,-963; isocyanate terminated polymers such as those disclosed in copending application S.N. 310,925, filed Sept. 23, 1963, in the name of E. F. Kutch, now abandoned and refiled as a continuation-in-part application, S.N. 632,541, filed Apr. 21, 1967; "high-rank" (—SSH) terminated polymers such as those disclosed in copending application S.N. 290,637, filed June 26, 1963, in the name of E. R. Bertozzi, now abandoned and refiled as a continuation application, S.N. 583,480, filed Sept. 30, 1966, now U.S. Pat. 3,331,818; blocked "high-rank" (—SSH) terminated polymers such as those disclosed in copending application S.N. 302,724, filed Aug. 16, 1963, in the name of E. R. Bertozzi, now abandoned, refiled as a continuation application, S.N. 620,559 filed Mar. 3, 1967, now abandoned, and refiled as a continuation application, S.N. 661,128, filed Aug. 16, 1967, now U.S. Pat. 3,422,007; and amine (—NH$_2$) terminated polymers such as those disclosed in U.S. 2,606,173 and in S.N. 398,422, filed Sept. 22, 1964, in the name of E. R. Bertozzi, now U.S. Pat. 3,331,816. These polymers have a molecular weight of about 500 to 12,000 and are liquid, i.e., pourable, at room temperature (about 25° C.). Structurally, they may be represented by the formula $FR'S_x(RS_x)_mR'F$ wherein $x$ is about 1.0 to 5.0; $m$ is an integer of from 1 to about 100; R and R' are bivalent aliphatic radicals wherein the carbon atoms may be interrupted with oxygen atoms; and F may be an —SSH; —SH; —NH$_2$; OH; a hemiacetal or hemiketal group of the structure

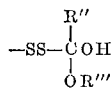

wherein R'' may be H or a lower alkyl group and wherein R''' may be a lower alkyl group; or an

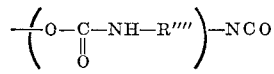

group wherein R'''' may be an alkylene or an arylene group.

The most preferred of such polymers, according to the present invention, are those having a molecular weight of about 500 to 4000, since polymers having these preferred molecular weights allow for the most efficient cure times.

The curing agents for the liquid polysulfide polymer which may be used in the sealant compositions of the present invention include all those materials known to the art as liquid polysulfide polymer curing agents such as polyepoxy resins, lead peroxide, calcium peroxide, barium peroxide, tellurium dioxide, manganese dioxide, cumene hydroperoxide, zinc peroxide, p-quinonedioxime, zinc oxide, the various chromate salts such as are disclosed in U.S. 2,964,503, and the curing agents of U.S. 2,606,173 and the copending applications previously cited. About 2.5 to 10 parts by weight of one or more of such curing agents should be used according to the present invention, per 100 parts by weight of liquid polysulfide polymer being used in the sealant composition. These curing agents may be used singularly or in various combinations with one another.

The polysulfide polymer compositions of the present invention also include those compositions containing bituminous materials such as disclosed in U.S. 2,910,922 and those compositions of U.S. 3,238,165 containing a polyepoxide and bituminous materials.

The curable polysulfide polymer compositions and the primer compositions of the present invention may also contain various types of inert materials commonly employed in polysulfide polymer based sealant and caulking compositions such as adhesive additives, fillers, plasticizers, pigments, ultraviolet light stabilizers, cure accelerators, perfumes, and the like.

The following examples are merely illustrative of the present invention and are not intended as a limitation upon the scope thereof.

EXAMPLE 1

A primer solution is made by mixing together the following ingredients in the following proportions, expressed in parts by weight.

Chlorinated natural rubber _____ 25
Toluene (solvent) _____ 17.5
Cellosolve acetate (solvent) _____ 17.5
Chlorinated biphenyl plasticizer _____ 15
Toluene diisocyanate _____ 25

This primer solution is composed of about 50% solids by weight. This primer solution is then applied by brush to dry cured concrete. The cured concrete test specimens are shaped to resemble dogbone halves and had a cross-sectional area of about 1 square inch. These concrete test specimens are cast from a mortar mix made from 1 part by weight of Portland cement, 2 parts by weight of fine concrete aggregate, and sufficient water to produce a uniform concrete mix. The composition conforms to ASTM 1191–64. After the mortar is set in the mold overnight it is immersed in water and allowed to cure for one week therein. The dogbones are prepared in a manner similar to that described in ASTM C190–63.

Forty-five minutes after applying the primer to the concrete, a sealant of the following composition is applied to the primed concrete:

Sealant formulation

| | Parts by weight |
|---|---|
| Polysulfide polymer [1] | 100 |
| Chlorinated biphenyl plasticizer | 100 |
| Calcium carbonate filler | 75 |
| Inert clay filler | 25 |
| 50/50 PbO$_2$/chlorinated biphenyl plasticizer | 15 |

[1] The polysulfide polymer had essentially the structure

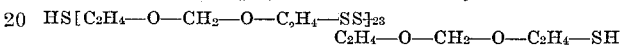

with about 2% crosslinking or branching, a molecular weight of about 4,000, and an average viscosity at 77° F. of 400 poises.

The sealant is applied to the concrete dogbone specimen halves, spaced one-half inch apart by damming with aluminum foil and then gunning into the space between the concrete dogbone specimen halves. Excess sealant and foil are trimmed away to conform to the one square inch cross-section area of the concrete dogbone specimen halves.

The sealant of the concrete dogbone specimen is then allowed to cure and become conditioned for a one-week time period at room temperature. At the end of this one week curing and conditioning period the sealant bond between the two concrete dogbone specimen halves are tested for tensile strength and ultimate elongation on an Instron Tensile Tester produced by Instron Engineering Corporation of Canton, Mass., using a crosshead speed of one inch per minute. The test is conducted similarly to the procedure outlined in the "Proposed Specification for Sealing Compounds for the Building Trade (Polysulfide Base or Equivalent)," ASTM Bulletin No. 242, pp. 47–8, December 1959.

If the concrete-sealant-concrete bond fails at an interface between the sealant and the concrete without causing rupture to the structure of the sealant, this is noted as an "adhesive failure." Adhesive failure is indicative of poor adhesion of the sealant concrete bond. If the sealant ruptures or tears apart rather than pulling off from one of the concrete interfaces, this is noted as a "cohesive failure." Cohesive failure is indicative of good adhesion of the sealant-concrete bond.

The results of these tests and subsequent tests made at various intervals after continuous immersion under water at room temperature is noted in Table I.

TABLE I

| Time and condition | Tensile strength, p.s.i. | Ultimate elongation, percent |
|---|---|---|
| 1 week after sealant is applied | 82C [1] | 250 |
| 1 week in H$_2$O | 41AC [2] | 100 |
| 1 month in H$_2$O | 27AC | 70 |
| 2 months in H$_2$O | 30AC | 70 |
| 3 months in H$_2$O | 42AC | 120 |
| 6 months in H$_2$O | 41AC | 100 |

[1] C=Cohesive failure.
[2] AC=Adhesive and cohesive failure.

The sealant formulation of this example is applied to an unprimed concrete dogbone specimen in the manner above described. One week after application of the sealant the bond, when tested according to the above described procedure, results in adhesive failure.

Similar results are obtained when a high rank polysulfide polymer having a sulfur rank of 3.5 such as described in Example 19 of U.S. Pat. 3,331,818 is substituted for the polysulfide polymer in the above sealant formulation, and the material is tested in the manner described above. Thus, good adhesion is obtained by the use of the primer and poor to no adhesion is obtained when no primer is used.

EXAMPLE 2

The procedure of Example 1 is followed except that the primer and sealant are applied to concrete dogbone halves saturated with water (about 15–16% by weight H₂O). Test results are recorded in Table II.

TABLE II

| Time and condition | Tensile strength, p.s.i. | Ultimate elongation, percent |
|---|---|---|
| 1 week after sealant is applied | 86C | 300 |
| 1 week in H₂O | 67AC | 240 |
| 1 month in H₂O | 56AC | 170 |
| 2 months in H₂O | 47AC | 160 |
| 3 months in H₂O | 51AC | 160 |
| 6 months in H₂O | 51AC | 160 |

EXAMPLES 3–5

The procedure of Examples 1 and 2 are followed in Examples 3–5 except for the composition of the respective primers and the composition of the sealant.

Sealant composition of Examples 3–5

| | Parts by weight |
|---|---|
| Polysulfide polymer [1] | 100 |
| Carbon black filler | 100 |
| Chlorinated biphenyl plasticizer | 100 |
| Silica thickener | 6 |
| Stearic acid (retarder) | 1 |
| 50/50 PbO₂/Chlorinated biphenylplasticizer | 15 |

[1] The polysulfide polymer had essentially the structure
HS[C₂H₄—O—CH₂—O—C₂H₄—SS]₂₃
        C₂H₄—O—CH₂—O—C₂H₄—SH
with about 0.5% crosslinking or branching and had a molecular weight of about 4,000.

The Primer compositions were as follows:

Primer—Example 3 (same as Examples 1 and 2)

| | |
|---|---|
| Chlorinated natural rubber | 25 |
| Toluene (solvent) | 17.5 |
| Cellosolve acetate (solvent) | 17.5 |
| Chlorinated biphenyl solvent | 15 |
| Toluene diisocyanate | 25 |

(Solids—about 50% by weight.)

Primer—Example 4

| | |
|---|---|
| Chlorinated natural rubber | 25 |
| Chlorinated biphenyl solvent | 12.5 |
| Chlorinated paraffin tackifier | 12.5 |
| Aromatic solvent | 40 |
| Mineral Spirits (solvent) | 10 |

(Solids—about 25% by weight.)

Primer—Example 5

| | |
|---|---|
| Toluene diisocyanate | 50 |
| Toluene (solvent) | 50 |

(Solids—about 50% by weight.)

The tests conducted as in Examples 1 and 2 give the results shown in Table III.

EXAMPLE 6

The procedures of Examples 1 and 2 are followed except that the sealant has the following composition:

Sealant formulation

| | Parts by weight |
|---|---|
| Polysulfide polymer [1] | 100 |
| Chlorinated biphenyl (plasticizer) | 5 |
| Calcium carbonate filler | 30 |
| Titanium dioxide pigment | 10 |
| Silica thickener | 3 |
| Phenolic adhesive additive | 5 |
| 50/50 PbO₂/Aroclor 1254 (chlorinated biphenyl plasticizer) | 15 |

[1] The polysulfide polymer had essentially the structure
HS[C₂H₄—O—CH₂—O—C₂H₄—S—S]₂₃
         C₂H₄—O—CH₂—O—C₂H₄—SH
with about 2% crosslinking or branching and had a molecular weight of about 4,000.

The test results from tests conducted in the manner described in Example 1 are as follows in Table IV.

TABLE IV.—CONCRETE ADHESION

| | Tensile strength, p.s.i. | Ultimate elongation, percent |
|---|---|---|
| 1 week after sealant is applied: | | |
| Dry | 58C [1] | 690 |
| Wet | 53C | 660 |
| 1 week in H₂O: | | |
| Dry | 50C | 510 |
| Wet | 48C | 510 |
| 1 month in H₂O: | | |
| Dry | 53C | 490 |
| Wet | 54C | 540 |
| 2 months in H₂O: | | |
| Dry | 52C | 450 |
| Wet | 50C | 500 |
| 3 months in H₂O: | | |
| Dry | 55C | 390 |
| Wet | 55C | 420 |

[1] C=Cohesive failure.

EXAMPLE 7

Three concrete blocks are primed as in Example 1 with a primer of the following composition:

| | Parts by weight |
|---|---|
| Chlorinated natural rubber | 7.5 |
| Toluene diisocyanate | 7.5 |
| Toluene (solvent) | 29.75 |
| Cellosolve acetate (solvent) | 29.75 |
| Chlorinated biphenyl (plasticizer) | 25.5 |

(Solids—15% by weight.)

After the primed concrete block are allowed to dry for approximately one hour, a polysulfide sealant of the same composition as that described in Example I is applied to the primed concrete surfaces. After one week of curing at room temperature and under ordinary moisture conditions, the sealant bead of block No. 1 is tested for adhesion to the concrete substrate in a manner similar to that described in Example 1. The sealant-concrete bond results in cohesive failure.

Blocks No. 2 and 3 are placed under water at the end of the one week curing period. After one week under wa- TABLE III
Concrete Adhesion—Primer Applied to Dry Concrete (5–7% H₂O)

| | 1 week after sealant applied | | 1 week in H₂O | | 1 month in H₂O | | 2 months in H₂O | | 3 months in H₂O | |
|---|---|---|---|---|---|---|---|---|---|---|
| | Tensile strength | ult. elong. | Tensile strength | ult. elong. | Tensile strength | ult. elong. | Tensile strength | ult. elong. | Tensile strength | ult. elong. |
| Toluene diisocyanate/chlorinated rubber primer of Example 3 | 92C [1] | 260 | 81AC | 190 | 64AC | 120 | 55AC | 100 | 34AC | 80 |
| Chlorinated rubber primer of Example 4 | 64AC [2] | (4) | 69AC | (4) | 25A[3] | 30 | 13A | (4) | (4) | (4) |
| Toluene diisocyanate primer of Example 5 | 75AC | 240 | 42A | 220 | 22A | 30 | (4) | (4) | (4) | (4) |

Concrete Adhesion—Primer Applies to Wet Concrete (about 15–16% by weight H₂O)

| | | | | | | | | | | |
|---|---|---|---|---|---|---|---|---|---|---|
| Toluene diisocyanate/chlorinated rubber primer of Example 3 | 92C | 280 | 65AC | 140 | 73AC | 160 | 55AC | 120 | 43AC | 100 |
| Chlorinated rubber primer of Example 4 | (4) | (3) | 34A | (4) | 25.4 | 80 | (4) | (4) | (4) | (4) |
| Toluene diisocyanate primer Example 5 | 76AC | 220 | 43A | 300 | 48A | 100 | (4) | (4) | (4) | (4) |

[1] C=Cohesive failure. [2] AC=Adhesive and cohesive failure. [3] A=Adhesive failure. [4] A=Adhesion is so poor that no tests were conducted.

ter at room temperature, block No. 2 is tested for adhesion of the sealant to the block in the same manner as block No. 1. The bond failure of block No. 2 is "adhesive" to "slightly cohesive." After six weeks under water at room temperature block No. 3 is tested as described above. The sealant bond of block No. 3 suffers cohesive failure.

EXAMPLE 8

A primer composition of the following composition in parts by weight are made up as in Example 1:

Primer composition

| | Parts by weight |
|---|---|
| Chlorinated natural rubber | 25 |
| Toluene (solvent) | 17.5 |
| Cellosolve acetate (solvent) | 17.5 |
| Chlorinated biphenyl (plasticizer) | 15 |
| Triphenyl methane 4,4',4"-triisocyanate | 25 |

This primer composition was applied to a dry concrete substrate and allowed to dry for one hour. At this time, the sealant of Example 1 was applied to the primed concrete substrate. After 1 week of curing at room temperature the adhesion of the sealant to the concrete substrate was tested for adhesion in a manner similar to Example 1. The test resulted in cohesive failure of the sealant bead. After one week under $H_2O$ at room temperature the sealant-concrete bond, when tested, resulted in cohesive failure of the sealant bead. After one month under water the test was again repeated and again resulted in cohesive failure of the sealant bead.

EXAMPLE 9

A block of asphalt is primed with a toluene diisocyanate/chlorinated rubber primer composition of the same composition as described in Example 1.

About 45 minutes after application of the primer to the asphalt, the sealant of Example 1 is applied to the primed asphalt.

The above sealant is applied to an unprimed asphalt block of the same type and composition as used with the primer of this example. One week after the sealant is applied to both blocks the bonds are tested for adhesion.

The sealant-asphalt bond of the unprimed asphalt block results in immediate adhesive failure, whereas the sealant-asphalt bond of the primed asphalt block results in cohesive failure upon subjection to an equivalent amount and type of pull.

Similar results are obtained when a sealant as used above is mixed with coal tar in a 1:1 weight ratio.

I claim:

1. In an article of manufacture comprising at least one substrate selected from the group consisting of a hydraulic cementitious and an asphaltic substrate, and a body of polysulfide polymer composition cured in situ against and bonded to said substrate, the improvement comprising a primer comprising a halogenated rubber selected from the group consisting of chlorinated natural rubber, brominated natural rubber, chlorinated butyl rubber, chloroprene, chlorinated polyethylene rubber and chlorosulfonated polyethylene rubber and a polyisocyanate compound selected from the group consisting of aliphatic and aromatic polyisocyanates at the interface between the surface of the substrate and the body of the polysulfide polymer composition, wherein the ratio of halgoenated rubber to polisocyanate compound ranges from about 1:5 to about 5:1, in parts by weight.

2. An article of manufacture as in claim 1 wherein the halogenated rubber is a chlorinated natural rubber.

3. An article of manufacture as in claim 2 wherein the polyisocyanate compound is 2,4-toluene diisocyanate.

References Cited

UNITED STATES PATENTS

| 2,417,792 | 3/1947 | Verbanc. | |
| 2,766,164 | 10/1956 | Salem. | |
| 3,453,243 | 7/1969 | Hartlein | 117—72 X |

FOREIGN PATENTS

| 745,349 | 2/1956 | Great Britain. |

WILLIAM D. MARTIN, Primary Examiner

R. HUSACK, Assistant Examiner

U.S. Cl. X.R.

117—77, 92, 123